United States Patent
Chen et al.

(10) Patent No.: US 8,375,200 B2
(45) Date of Patent: Feb. 12, 2013

(54) EMBEDDED DEVICE AND FILE CHANGE NOTIFICATION METHOD OF THE EMBEDDED DEVICE

(75) Inventors: Chien-Hua Chen, Taipei Hsien (TW); Yi-Hsiu Tseng, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 320 days.

(21) Appl. No.: 12/953,465

(22) Filed: Nov. 24, 2010

(65) Prior Publication Data

US 2012/0036345 A1   Feb. 9, 2012

(51) Int. Cl.
*G06F 15/177* (2006.01)
*G06F 9/00* (2006.01)
(52) U.S. Cl. .............................. 713/100; 713/1; 717/168
(58) Field of Classification Search .................. 713/1, 2, 713/100; 717/168
See application file for complete search history.

(56) References Cited

U.S. PATENT DOCUMENTS

| | | | | |
|---|---|---|---|---|
| 6,480,953 | B1 * | 11/2002 | Hughes | 713/1 |
| 7,318,148 | B2 * | 1/2008 | Scheibli | 713/1 |
| 7,353,374 | B1 * | 4/2008 | Trimberger | 713/1 |
| 8,195,624 | B2 * | 6/2012 | Yang | 707/687 |
| 8,195,931 | B1 * | 6/2012 | Sharma et al. | 713/100 |

* cited by examiner

*Primary Examiner* — Thuan Du
(74) *Attorney, Agent, or Firm* — Altis Law Group, Inc.

(57) ABSTRACT

A file change notification method of an embedded device that includes a first operating system (OS) and a second OS. The first OS corresponds to a first central processing unit (CPU) and connects to a storage system, the second OS corresponds to a second CPU for sharing with the configuration file via a network file system (NFS). The method monitors the configuration file stored in the storage system, determines whether the configuration file has been modified, and generates a notification message to notify a first application program that the configuration file has been changed. The method further sends the notification message from the first OS to the second OS through a communication network, and notifies a second application program that the configuration file has been changed when the notification message is received from the first OS.

18 Claims, 2 Drawing Sheets

EMBEDDED DEVICE AND FILE CHANGE NOTIFICATION METHOD OF THE EMBEDDED DEVICE

BACKGROUND

1. Technical Field

Embodiments of the present disclosure relate to message notification systems and methods, and particularly to an embedded device and a file change notification method of the embedded device.

2. Description of Related Art

Embedded devices may include multiple central processing units (CPUs), each of which may correspond to an operating system (OS), such as WINDOWS or LINUX, for example. Each OS may have one configuration file with the same content to be executed by the corresponding CPU. Therefore, the configuration files are stored separately on different storage devices, requiring in usage of more disk space of the storage devices. If a configuration file is modified in one storage device, the changed configuration file must be copied to the other storage device synchronously. However, the file synchronization is complex and may have low efficiency of the embedded device.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a program language. In one embodiment, the program language may be Java or C. One or more software instructions in the modules may be embedded in firmware, such as an EPROM. The modules described herein may be implemented as either software and/or hardware modules and may be stored in any type of computer-readable medium or other storage device.

Figure 1:
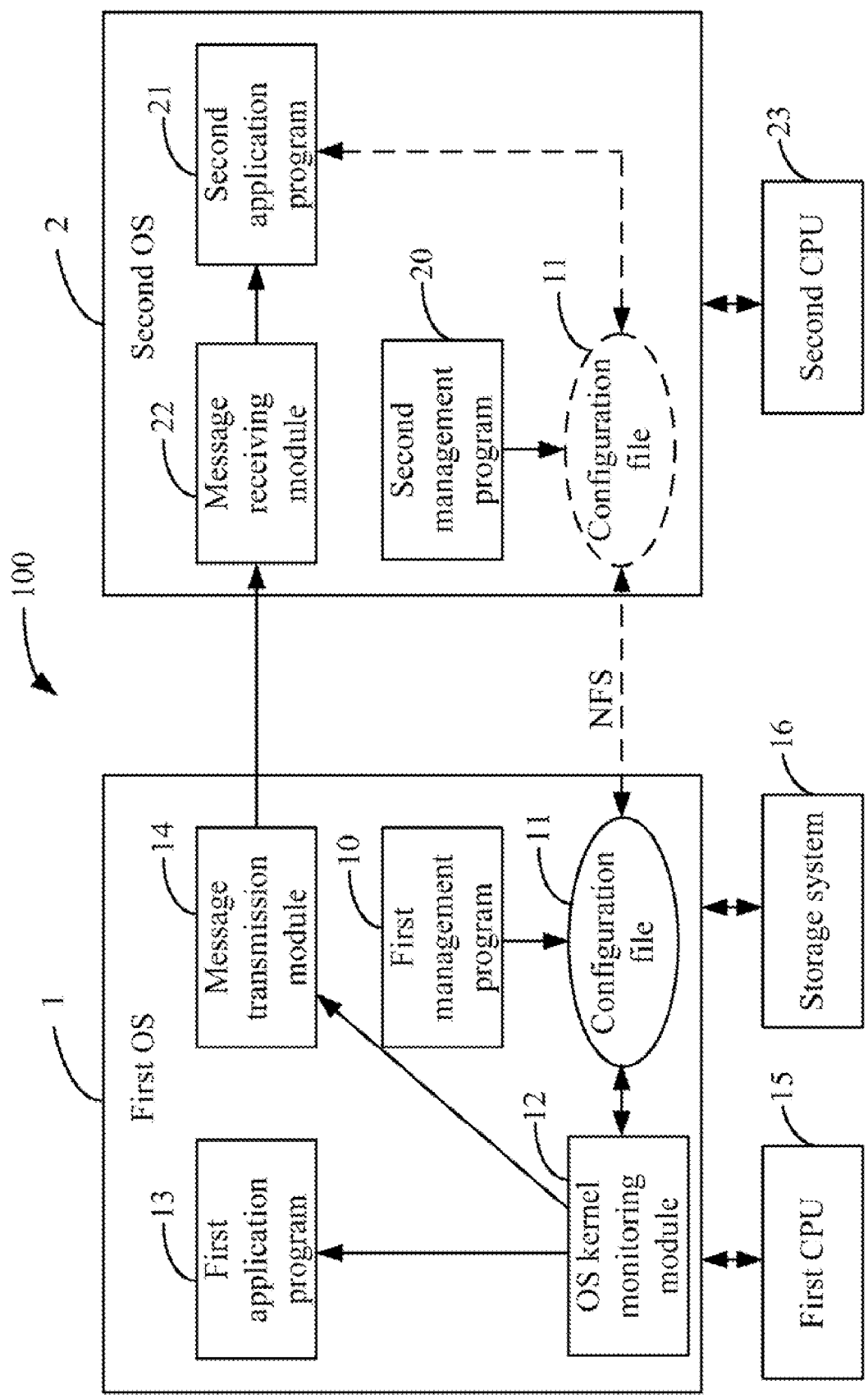
FIG. 1 is a schematic diagram of one embodiment of an embedded device.

FIG. 1 is a schematic diagram of one embodiment of an embedded device 100. In the embodiment, the embedded device 100 may be consisted of one or more computing devices, such as a desktop computer, a notebook computer, a sever, or a workstation. The embedded device 100 may include a plurality of operating systems (OS), such as WINDOWS or LINUX, for example. In the embodiment, the embedded device 100 may further includes a first OS 1, a second OS 2, and a storage system 16. The first OS 1 corresponds to a first central processing unit (CPU) 15, and is executed by the first CPU 15. The second OS 2 corresponds to a second CPU 23, and is executed by the second CPU 23. It should be understood that FIG. 1 illustrates only one example of the embedded device 100, and may include more or fewer components than illustrated, or a different configuration of the various components in other embodiments.

In one embodiment, the first OS 1 includes a first management program 10, a configuration file 11, an OS kernel monitoring module 12, a first application program 13, and a message transmission module 14. The second OS 2 includes a second management program 20, a second application program 21, and a message receiving module 22. The message transmission module 14 communicates with the message receiving module 22 through a communication network, such as a local area network (LAN), for example. The modules 12, 14, 21 may comprise computerized code in the form of one or more programs that are stored in the storage system 16. The computerized code includes instructions that are executed by the first CPU 1 and the second CPU 2 to provide functions for implementing the file change notification between the first OS 1 and the second OS 2.

The storage system 16 corresponds to the first OS 1, and stores the configuration files 11. The second OS 2 shares the configuration file 11 with the first OS 1 via a network file system (NFS). The configuration files 11 records configuration information of hardware and software for the embedded device 100, such as configuration information of the first CPU 1, the second CPU 2, the storage system 16, and I/O ports. In one embodiment, the storage system 16 may be an internal storage device, such as a random access memory (RAM) for temporary storage of information, and/or a read only memory (ROM) for permanent storage of information. In some embodiments, the storage system 16 may also be an external storage device, such as an external hard disk, a storage card, or a data storage medium.

Each of the first management program 10 and the second management program 20 provides a user management interface for modifying the configuration information of the embedded device 100. The configuration file 11 has been updated according to the modified configuration information when the configuration information has been modified by the first management program 10 or the second management program 20.

The OS kernel monitoring module 12 is operable to monitor the configuration file 11 in real time and determine whether the configuration file 11 has been modified by the first management program 10 or the second management program 20. When the configuration file 11 has been modified, the OS kernel monitoring module 12 generates a notification message to notify the first application program 13 that the configuration file 11 has been changed, and sends the notification message to the message transmission module 14 synchronously. The first application program 13 obtains the changed information of the configuration file 11 from the storage device 16 when the notification message is received from the OS kernel monitoring module 12.

The message transmission module 14 is operable to send the notification message from the first OS 1 to the second OS 2 through the communication network. In the embodiment, the OS 2 receives the notification message from the message transmission module 14 through the message receiving module 22. The message receiving module 22 notifies the second application program 21 that the configuration file 11 has been changed when the notification message is received from the message transmission module 14. The second application program 21 obtains the changed information of the configuration file 11 from the first OS 1 using the NFS when the notification message is received from the message receiving module 22.

Figure 2:
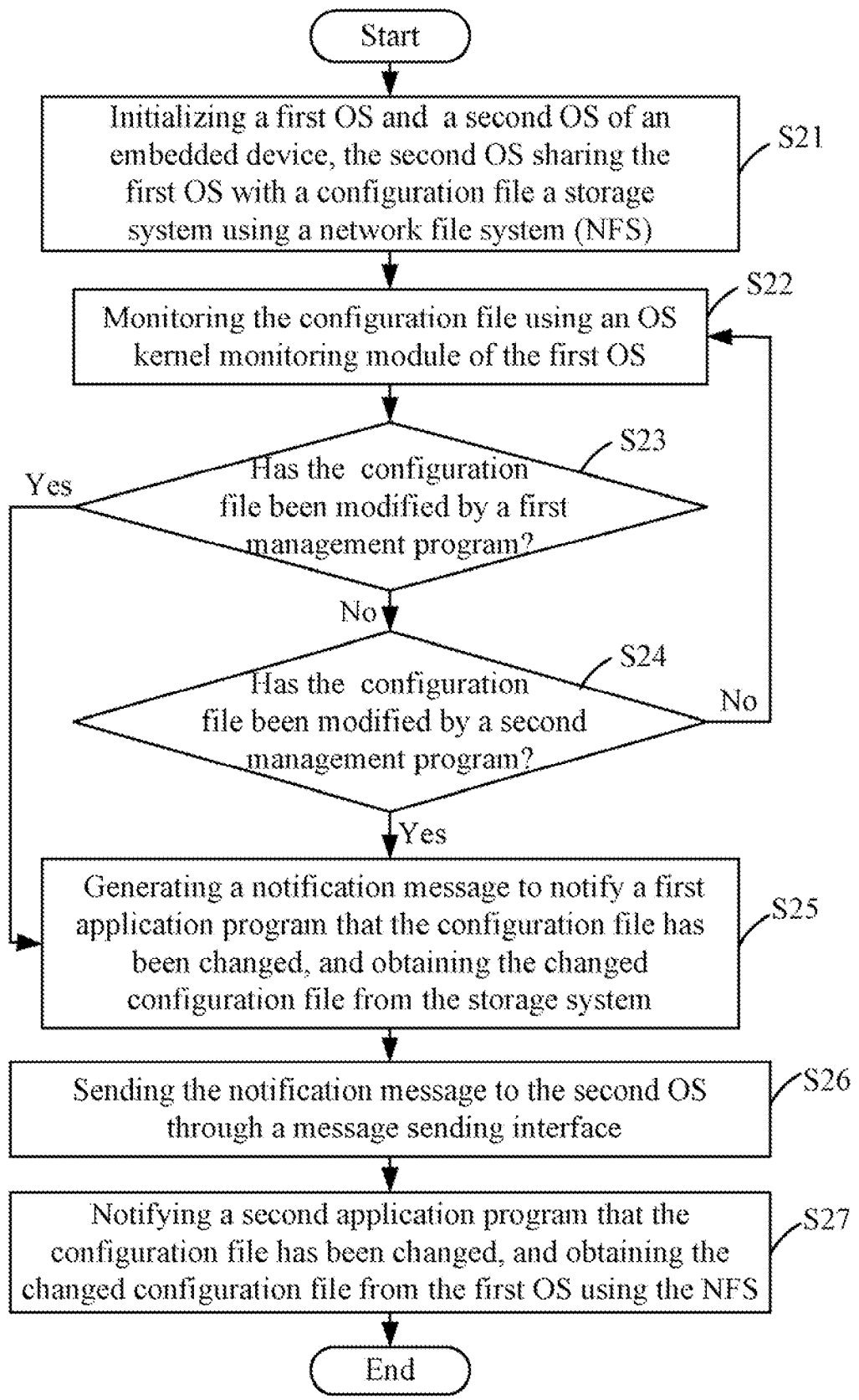
FIG. 2 is a flowchart of one embodiment of a file change notification method of a computing device, such as the embedded device of FIG. 1.

FIG. 2 is a flowchart of one embodiment of a file change notification method of a device, such as the embedded device 100 of FIG. 1, for example. In the embodiment, the method can monitor configuration files that are shared with multiple operating systems in real time. When any configuration file has been changed in one operating system, the method notifies each of the operating systems to share the changed configuration file. Depending on the embodiment, additional blocks may be added, others removed, and the ordering of the blocks may be changed.

In block S21, the first CPU 15 initializes a first OS 1, and the second CPU 23 initializes a second OS 2. The second OS 2 shares a configuration file 11 stored in the storage system 16 with the first OS 1 via a network file system (NFS). As mentioned above, the configuration file 11 records configuration information of hardware and software for the embedded device 100, such as the configuration information of the first CPU 1, the second CPU 2, the storage system 16, and I/O ports.

In block S22, the OS kernel monitoring module 12 monitors the configuration file 11 of the first OS 1 in real time. In block S23, the OS kernel monitoring module 12 determines whether the configuration file 11 has been modified by the first management program 10. If the configuration file 11 has been modified by the first management program 10, block S25 is implemented. Otherwise, if the configuration file 11 is not modified by the first management program 10, block S24 is implemented.

In block S24, the OS kernel monitoring module 12 determines whether the configuration file 11 has been modified by the second management program 20. If the configuration file 11 has been modified by the second management program 20, block S25 is implemented. Otherwise, if the configuration file 11 is not modified by the second management program 20, block S22 is repeated.

In block S25, the OS kernel monitoring module 12 generates a notification message to notify the first application program 13 that the configuration file 11 has been changed. When the notification message is received from the OS kernel monitoring module 12, the first application program 13 obtains the changed information of the configuration file 11 from the storage system 16 of the first OS 1.

In block S26, the OS kernel monitoring module 12 sends the notification message to the second OS 2 through the communication network. In the embodiment, the OS kernel monitoring module 12 sends the notification message to the message transmission module 14, and the message transmission module 14 sends the notification message to the message receiving module 22 of the second OS 2 through the communication network.

In block S27, the message receiving module 22 notifies the second application program 21 that the configuration file 11 has been changed when the notification message is received from the message receiving module 22. After the notification message is received, the second application program 21 obtains the changed information of the configuration file 11 from the first OS 1 using the NFS.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. An embedded device, comprising:
    a storage system for storing a configuration file;
    a first central processing unit (CPU), and a second CPU;
    a first operating system (OS) and a second OS, the first OS corresponding to the first CPU, the second OS corresponding to the second CPU for sharing the configuration file with the first OS via a network file system (NFS);
    one or more programs that are stored in the storage system and executed by the first CPU and the second CPU, the one or more programs comprising:
    an OS kernel monitoring module operable to monitor the configuration file stored in the storage system, determine whether the configuration file has been modified, and generate a notification message to notify a first application program that the configuration file has been changed;
    a message transmission module operable to send the notification message from the first OS to the second OS through a communication network; and
    a message receiving module operable to notify a second application program that the configuration file has been changed when the notification message is received from the first OS.

2. The embedded device according to claim 1, wherein the OS kernel monitoring module is further operable to determine whether the configuration file has been modified by a first management program of the first OS or a second management program of the second OS.

3. The embedded device according to claim 1, wherein the first application program is included in the first OS, and the second application program is included in the second OS.

4. The embedded device according to claim 3, wherein the first application program obtains the changed configuration file from the storage system when the notification message is received from the OS kernel monitoring module.

5. The embedded device according to claim 3, wherein the second application program obtains the changed configuration file from the storage system via the first OS using the NFS.

6. The embedded device according to claim 1, wherein the configuration file records configuration information of hardware and software of the embedded device that comprise configuration information of the first CPU, the second CPU, the storage system, and I/O ports.

7. A file change notification method of an embedded device, the method comprising:
    initializing a first operating system (OS) and a second OS of the embedded device, the second OS sharing with the first OS a configuration file that is stored in a storage system via a network file system (NFS);
    monitoring the configuration file to determine whether the configuration file has been modified;
    generating a notification message to notify a first application program that the configuration file has been changed upon the condition that the configuration file has been modified;
    sending the notification message from the first OS to the second OS through a communication network; and
    notifying a second application program that the configuration file has been changed when the notification message is received from the first OS.

8. The method according to claim 7, wherein the monitoring block comprises:
    determining whether the configuration file has been modified by a first management program of the first OS; and
    determining whether the configuration file has been modified by a second management program of the second OS.

9. The method according to claim 7, wherein the first application program is included in the first OS, and the second application program is included in the second OS.

10. The method according to claim 9, wherein the first application program obtains the changed configuration file from the storage system when the notification message is received.

11. The method according to claim 9, wherein the second application program obtains the changed configuration file from the storage system via the first OS using the NFS.

12. The method according to claim 7, wherein the configuration file records configuration information of hardware and software of the embedded device that comprise configuration information of a first central processing units (CPU), a second CPU, the storage system, and I/O ports.

13. A non-transitory storage medium having stored thereon instructions that, when executed by at least two central processing units (CPUs) of an embedded device, causes the embedded device to perform a file change notification method, the method comprising:
- initializing a first operating system (OS) and a second OS of the embedded device, the second OS sharing the first OS with a configuration file that is stored in a storage system via a network file system (NFS);
- monitoring the configuration file to determine whether the configuration file has been modified;
- generating a notification message to notify a first application program that the configuration file has been changed upon the condition that the configuration file has been modified;
- sending the notification message from the first OS to the second OS through a communication network; and
- notifying a second application program that the configuration file has been changed when the notification message is received from the first OS.

14. The non-transitory storage medium according to claim 13, wherein the wherein the monitoring block comprises:
- determining whether the configuration file has been modified by a first management program of the first OS; and
- determining whether the configuration file has been modified by a second management program of the second OS.

15. The non-transitory storage medium according to claim 13, wherein the first application program is included in the first OS, and the second application program is included in the second OS.

16. The non-transitory storage medium according to claim 15, wherein the first application program obtains the changed configuration file from the storage system when the notification message is received.

17. The non-transitory storage medium according to claim 15, wherein the second application program obtains the changed configuration file from the storage system via the first OS using the NFS.

18. The non-transitory storage medium according to claim 13, wherein the configuration file records configuration information of hardware and software of the embedded device that comprise configuration information of a first central processing units (CPU), a second CPU, the storage system, and I/O ports.

* * * * *

UNITED STATES PATENT AND TRADEMARK OFFICE
CERTIFICATE OF CORRECTION

PATENT NO. : 8,375,200 B2  
APPLICATION NO. : 12/953465  
DATED : February 12, 2013  
INVENTOR(S) : Chien-Hua Chen et al.

Page 1 of 1

It is certified that error appears in the above-identified patent and that said Letters Patent is hereby corrected as shown below:

On the title page, insert item (30) regarding "Foreign Application Priority Data" of the Patent with the following:

-- (30)      Foreign Application Priority Data

August 5, 2010 (CN) ........................2010 1 0246194 --

Signed and Sealed this  
Twenty-sixth Day of November, 2013

Margaret A. Focarino  
*Commissioner for Patents of the United States Patent and Trademark Office*